March 29, 1955     R. O. PETERSON     2,704,916
BUFF CONSTRUCTION

Filed July 12, 1950                                    5 Sheets-Sheet 1

INVENTOR.
RUBEN O. PETERSON
BY
Oberlin + Simbach
ATTORNEYS.

March 29, 1955  R. O. PETERSON  2,704,916
BUFF CONSTRUCTION

Filed July 12, 1950  5 Sheets-Sheet 2

INVENTOR.
RUBEN O. PETERSON
BY
Oberlin & Limbach
ATTORNEYS.

March 29, 1955 R. O. PETERSON 2,704,916
BUFF CONSTRUCTION
Filed July 12, 1950 5 Sheets-Sheet 3

INVENTOR.
RUBEN O. PETERSON
BY
Oberlin & Limbach
ATTORNEYS.

March 29, 1955 — R. O. PETERSON — 2,704,916
BUFF CONSTRUCTION
Filed July 12, 1950 — 5 Sheets-Sheet 4

INVENTOR.
RUBEN O. PETERSON
BY
Oberlin + Limbach
ATTORNEYS.

March 29, 1955  R. O. PETERSON  2,704,916
BUFF CONSTRUCTION

Filed July 12, 1950  5 Sheets—Sheet 5

INVENTOR.
RUBEN O. PETERSON
BY
Oberlin & Limbach
ATTORNEYS

# United States Patent Office 2,704,916
Patented Mar. 29, 1955

2,704,916
BUFF CONSTRUCTION

Ruben O. Peterson, University Heights, Ohio, assignor to The Osborn Manufacturing Company, Cleveland, Ohio, a corporation of Ohio Application July 12, 1950, Serial No. 173,465

6 Claims. (Cl. 51—193)

This application relates as indicated to buff construction, and more particularly to an abrasive buff having abrasive material, in granular or powdered form, adhered to the fabric of which such buff is comprised.

Rotary buffs are employed in a wide variety of surface finishing operations and may be required either to remove a considerable amount of material from the work surface being acted upon or merely to obtain a high finish or gloss on such surface. Perhaps the best known form of buff merely comprises an assemblage of textile fabric discs secured together in side-by-side relationship and provided with an appropriate hub or like supporting means for mounting on an arbor. Standard abrasive and polishing materials such as emery, Carborundum and rouge may be applied to the rotating buff in order that the latter may in turn apply the same to the surface to be conditioned. Certain waxes, oils, and greases may be incorporated with the abrasive or polishing material in order that the latter may be at least temporarily adhered to the working surface of the buff and not immediately thrown off and dispersed. This arrangement, of course, makes for somewhat messy working conditions and the work-piece must frequently be subsequently treated with a solvent or other cleansing agent to remove such wax, grease or oil therefrom. Inasmuch as the abrasive material is thus ordinarily intermittently applied to the rotating buff, it is obvious that the surface conditioning characteristics of the latter will be far from uniform and the work-piece or work-pieces therefore non-uniformly treated.

Merely to form the buff of fabric discs having abrasive adhered to one or both sides thereof has not proven a satisfactory solution for the reason, among others, that a very rigid "wheel" results which does not have the resilience and soft yielding action frequently desired in a buff. It is this yielding action which permits a buff to be forced against a work-piece without danger to the latter or to the buff but at the same time obtaining desired penetration into hollows and conformance to irregular contours of the article being buffed.

In most buffs now currently employed in industry, an undesirably large proportion of the buff material is contained in that portion of the buff adjacent the inner periphery of the same. Indeed, in an attempt to obtain a desirable density of buff material at the outer working periphery of the buff, it is common practice to compact such buff material to the extent possible about the inner periphery of the latter. As a result, a large proportion of the relatively expensive buff material may be concentrated adjacent the inner periphery where it will never serve a useful purpose and will be entirely wasted, while at the same time effectively preventing ventilation of the buff in use and so ensuring overheating of the same. Overheating may become a very serious problem and result in charring of the fabric, the latter sometimes actually catching fire. These problems are, of course, further exaggerated when abrasive coated fabric is utilized, such abrasive both adding to the bulk of the buff material and also tending to generate additional heat through frictional interaction of adjacent layers of fabric material.

It is accordingly a principal object of my invention to provide a novel buff construction utilizing fabric having abrasive material adhered thereto but which will retain substantially all of the normally desired characteristics of the usual untreated buff.

It is a further object to provide an abrasive buff which will be flexible and adapted to conform to the contours of a work-piece being acted upon.

Still another object is to provide a buff in which a very large proportion of the material, both fabric and abrasive, will be concentrated adjacent the outer periphery of the buff rather than adjacent the inner periphery of the same.

A further object is to provide a novel buff and method of assembling the same whereby such buff may be manufactured in a series of substantially continuous operations suitable for performance on brush-making machines already well known in the art.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 8:
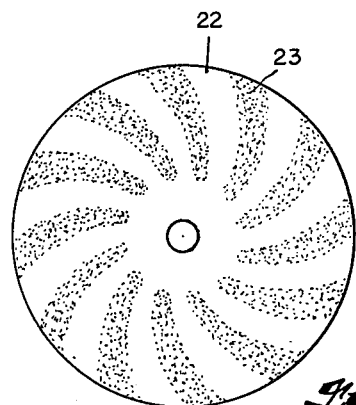
Figure 9:
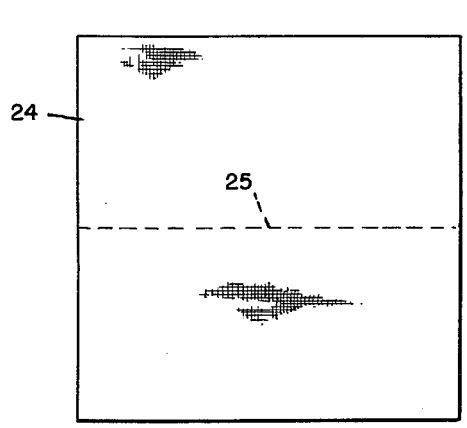
Figure 10:
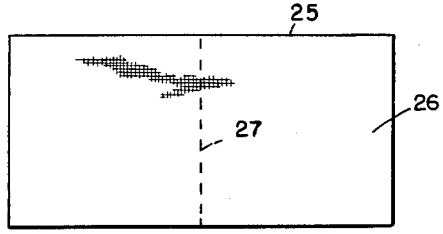
Figure 11:
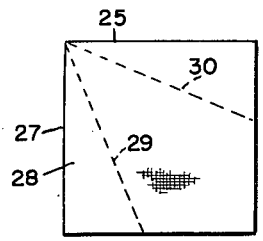

Figs. 4–7 inclusive illustrate another modified form of abrasive buff and method of manufacturing the same generally similar to that disclosed and claimed in my co-pending application Serial No. 81,985, filed March 17, 1949;

Fig. 8 shows a fabric disc suitable for use in the manufacture of rotary abrasive buffs in accordance with my invention having abrasive applied thereto in a manner designed to permit such buff to yield substantially when brought into forceful engagement with a work-piece;

Figs. 9–14 inclusive illustrate a preferred manner of folding a sheet of buff material to form a buffing finger adapted to be assembled with other such fingers into a novel type of rotary buff;

Figs. 15–20 inclusive illustrate a preferred method of thus assembling such fingers into the finshed article, particularly adapted for machine manufacture.

Figure 5:
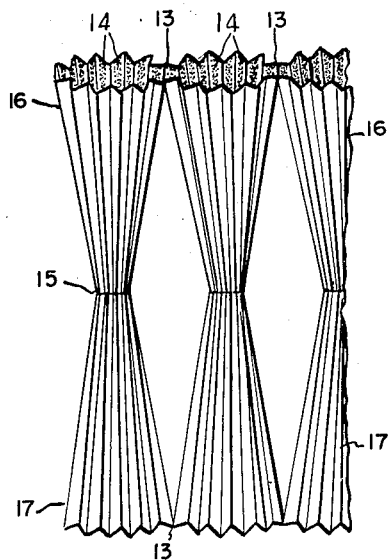
Figure 6:
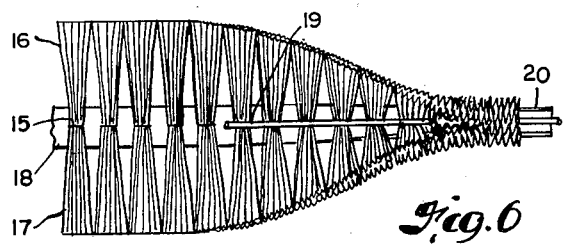
Figure 15:
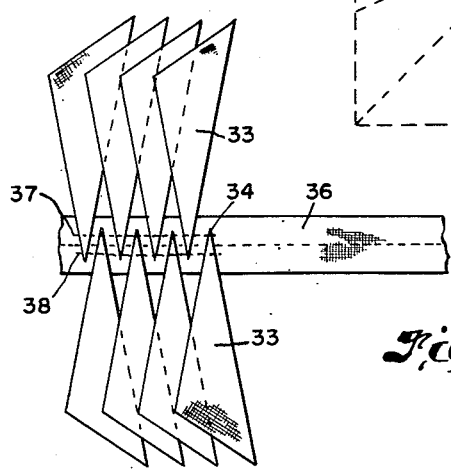
Figure 21:
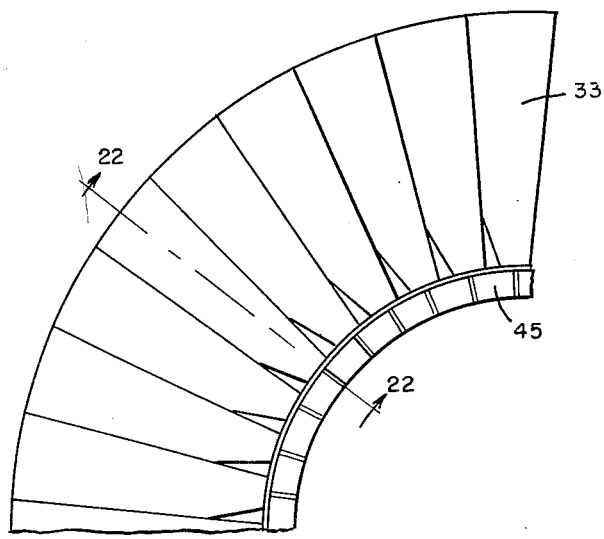
Figure 22:
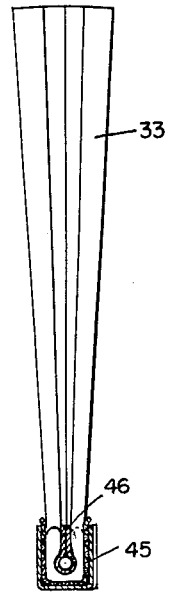
Figure 23:
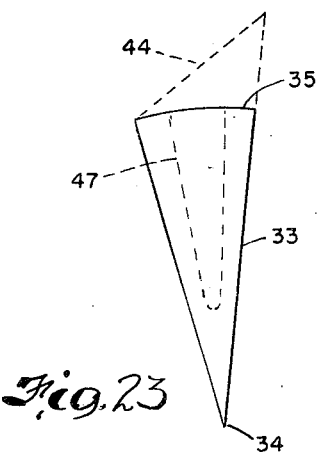
Figure 24:
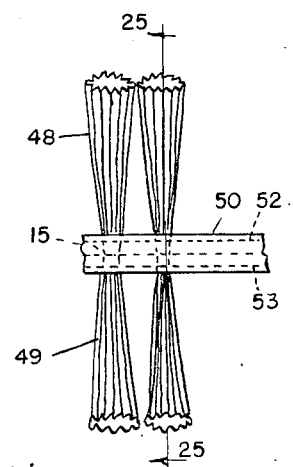
Figure 25:
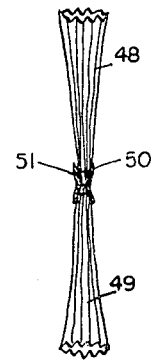

Figs. 21 and 22 illustrate a buff construction in which the buff material of Figs. 9–15 inclusive is assembled with retaining means of the type disclosed in Whittle Patent No. 2,288,337;

Fig. 23 is a detail view of one such buff finger produced as shown in Figs. 9–14 inclusive and indicating the region to which abrasive material may desirably be adhered;

Fig. 24 is a detail view showing oppositely extending buffing fingers of a type somewhat resembling those of Fig. 5 but secured to a continuous central strip in a manner generally similar to that shown in Fig. 15; and Fig. 25 is a transverse sectional view taken on the line 25—25 on Fig. 24.

Figure 1:
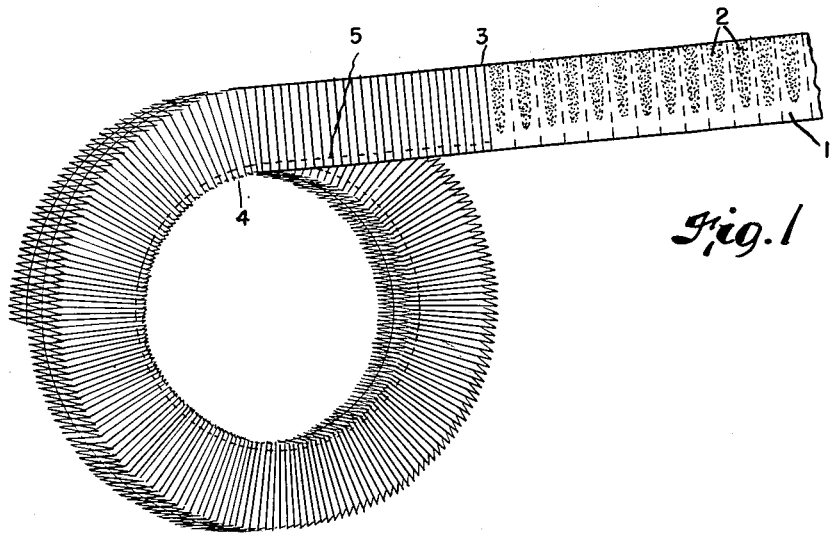
Figs. 1 and 2 illustrate a rotary buff and method of producing the same of a type generally similar to that disclosed in Murray Patent No. 2,140,208 but modified by the application of abrasive to the fabric thereof in the manner taught by my invention.
Figure 2:
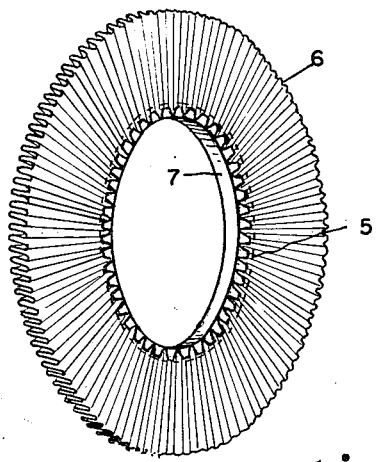

Referring now more particularly to said annexed drawing and especially Figs. 1 and 2 thereof, the method of forming a rotary buff illustrated in such figures is generally similar to that disclosed in Murray Patent No. 2,140,208. A continuous strip 1 of fabric buff material which may, for example, be of bias cotton sheeting has "printed" thereon a series of transverse stripes 2 of powdered or granular abrasive material such as emery, for example, adhered to the fabric by means of an appropriate adhesive such as one of the resin base adhesives commonly employed for such purposes. As shown in Fig. 1, such abrasive stripes will preferably extend entirely to one edge of the fabric strip 1, but the other ends of the stripes will be somewhat spaced from the other edge of the fabric strip, commonly from one-quarter to one-third of the width of such strip from such edge. Furthermore, such abrasive stripes, while spaced from adjacent stripes throughout their length, will be somewhat wider in the regions adjacent the fabric edge to which they extend and will gradually taper to the other end of such stripe. These abrasive stripes may be applied to one side of the fabric strip only or to both sides of the same, but if applied to both sides the stripes on each side will be directly opposite one another.

The strip of buff material thus treated will then be folded in accordion pleats along transverse lines between each such abrasive stripe and the adjacent stripe as at 3 on Fig. 1 and circularized into a helix as at 4 on such figure, with the edge of strip 1 to which the abrasive stripes 2 do not extend forming the inner periphery of such helix. Stitching 5 may be employed to secure the folded or pleated material in such condition, such stitching being provided in the non-abrasive edge portion of the fabric and therefore adjacent the inner periphery of the circularized material. Alternatively, a suitable adhesive may be employed for this purpose.

A single turn 6 of such circularized pleated material (Fig. 2) may be secured in a binding ring 7 of the general type disclosed in Patent No. 1,922,108 or in any other well-known type of annular binding ring or hub. It will thus be seen that an annular rotary buff element has been provided having abrasive applied thereto in a manner which neither interferes with the manufacture of the same nor deleteriously affects the desired resilient characteristics of the finished buff.

Figure 3:
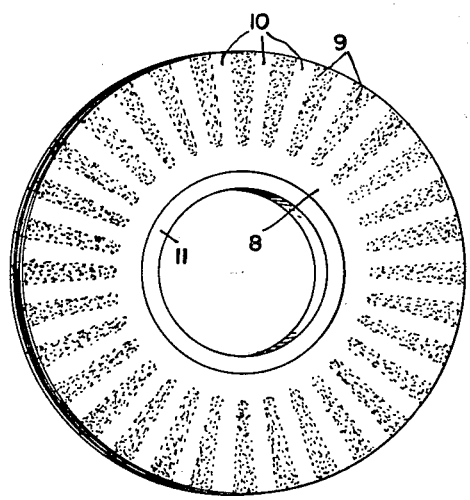
Fig. 3 illustrates another embodiment of my invention utilizing an assemblage of fabric discs having abrasive material applied thereto in radial stripes.

Referring now to Fig. 3 of the drawing, another embodiment of my invention is there illustrated comprising a plurality of superimposed annular fabric discs 8 having radial stripes 9 of powdered or granular abrasive material adhered thereto and extending to the outer periphery of the same. In the embodiment illustrated, such stripes are wider at their outer extremities at the periphery of the buff and taper toward the inner periphery of the latter. The uncoated fabric in the regions 10 intermediate such abrasive stripes may be of substantially uniform width. The abrasive stripes do not extend entirely to the inner periphery of the fabric discs, but their inner extremities are spaced therefrom. The resulting inner annular uncoated region of the buff layers may be stitched together in conventional fashion or mounted in a sheet metal hub or clamping ring 11. The outer peripheral region of the resultant buff may be more dense than the inner peripheral region due to the application of such abrasive stripes thereto. If such stripes are applied to both sides of each fabric disc, then it is much preferred that such stripes on opposite sides of a disc be directly opposite one another to facilitate flexing of the buff fabric along radial lines intermediate the same. It is not, however, necessary that the adjacent buff layers be assembled with the abrasive treated portions exactly opposed, and such layers may accordingly be assembled indiscriminately.

It will be seen that in both the Fig. 2 and Fig. 3 embodiments buffs are provided which essentially comprise a large number of radially extending abrasive fingers interconnected by narrow strips of uncoated fabric. Such "fingers" are accordingly permitted a degree of relative movement very different from the effect obtained when discs of fabric uniformly and completely coated with abrasive are assembled in side-by-side relationship. In the Fig. 2 embodiment, of course, such abrasive fingers will lie in planes including the axis of the buff whereas in the Fig. 3 embodiment such fingers will lie in planes transversely of such axis. In both types of construction, an additional ventilating feature is obtained inasmuch as the untreated fabric portions intermediate the abrasive fingers afford radial air passage. A very cool operating buff is thereby obtained.

Now referring to Figs. 4–7 inclusive of the drawing, a method of manufacturing an abrasive buff is there illustrated basically similar to that disclosed in my co-pending application Serial No. 81,985, filed March 17, 1949. A plurality of slightly overlapping discs 12 may be blanked out from a continuous strip of fabric with such discs overlapping slightly to provide interconnecting portions 13, thereby preserving such blanked-out material in the form of a continuous strip. Radially extending abrasive stripes 14 generally similar to stripes 9 may then be imprinted thereon, such stripes tapering toward the center of the discs along generally radial lines but with the inner ends of such stripes terminating a substantial distance from the centers of the discs. Two or more layers of discs are then superimposed and interconnected adjacent their respective centers as by stitching 15 or equivalent means such as adhesive. When certain plastic sheet materials are employed to form such discs, the two layers may be centrally adhered together by application of heat or solvent in well-known manner.

The two layers of discs are then separated as illustrated in Fig. 5 to form a series of pairs of oppositely extending buffing fingers 16 and 17 interconnected at their outer extremities at such points 13. In thus forming such oppositely extending buffing fingers the uncoated fabric intermediate the abrasive stripes will be folded to form pleats so that the resultant fingers 16 and 17 are of general conical tubular pleated form with the larger proportion of the material, both fabric and abrasive, adjacent the outer extremities of the same. If stripes of abrasive are imprinted on opposite sides of the fabric discs 12, then such stripes should be directly opposite one another to facilitate such pleating. Depending on the particular characteristics desired, the abrasive stripes may thus be imprinted on both faces of the fabric discs or on only the face which is to form either the exterior or interior surface of the conical pleated buffing finger.

A continuous series of such interconnected fingers may then be fed to a brush strip machine in the same general manner in which stranded brush material is commonly fed thereto as described in my Patent No. 2,303,386, for example, being placed transversely of a continuous flat metal strip 18 with an elongated retaining element such as wire 19 disposed centrally lengthwise therealong to secure such fingers within the channelform back 20 produced by turning up the side portions of metal strip 5. The resulting buff strip may be mounted in any form of holder desired or may be circularized either helically (Fig. 7) or to form a single turn annulus adapted to be seated on an arbor or otherwise mounted with the fabric fingers 16 and 17 extending substantially radially therefrom, the opposed ends of the metal channel base ordinarily being welded together. Or an annular buff may be produced as taught in Whittle Patent No. 2,288,337 employing my oppositely extending pairs of abrasive coated buff fingers instead of stranded brush material. Teeth 21 may be punched in from the sides of metal channel 20 to overlie retaining wire 19 and assist in securing the buff material within such channel as described in detail in my Patent No. 2,303,386. Such teeth also penetrate the buff fabric and in some cases suffice to secure the material in the channel back without employment of such wire. Various modifications of the foregoing method of assembly will be obvious to those skilled in the art without departing from the spirit of my invention, and several such modifications are described in my co-pending application Serial No. 81,985.

The term "fabric" as employed herein and in the claims is intended to include any suitable sheet material whether textile or imperforate plastic sheet, for example. Thus, cotton cloth, nylon (polyamide resins), Pliofilm (rubber hydrochloride), or certain types of paper sheet material are entirely suitable for use in embodiments of my invention for certain purposes, and other natural or manufactured fiber materials may likewise be employed.

Figure 4:
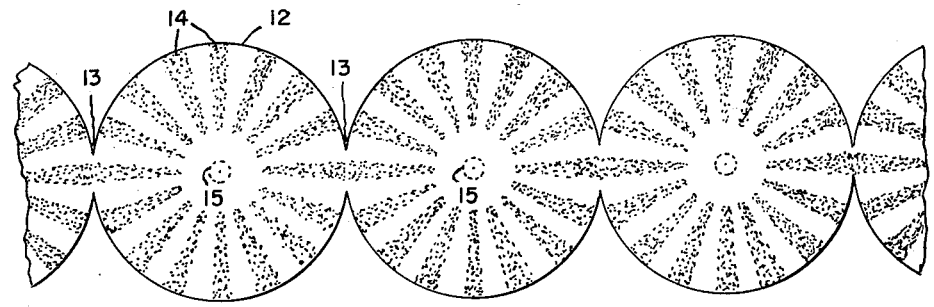

In Fig. 8 there is illustrated a fabric disc 22 having spaced abrasive stripes 23 applied thereto somewhat resembling such stripes as applied in the Fig. 3 and Fig. 4 embodiments. Stripes 23 are, however, of general volute conformation, tapering toward the center of disc 22. When a plurality of such discs are then assembled in side-by-side relationship, it will be seen that a rotary buff is obtained which may have rather more "give" or yielding characteristics when brought into engagement with the work than is the case with a buff of the Fig. 3 type having an equal area coated with abrasive. As previously indicated, if such stripes 23 are applied to both sides of an individual fabric disc 22, such stripes will preferably be directly opposite one another. A buff of the Fig. 8 type should, of course, ordinarily be mounted for rotation in a clockwise direction as shown in such figure.

Figure 12:
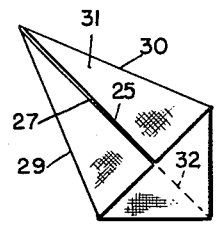
Figure 13:
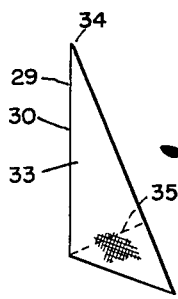
Figure 14:
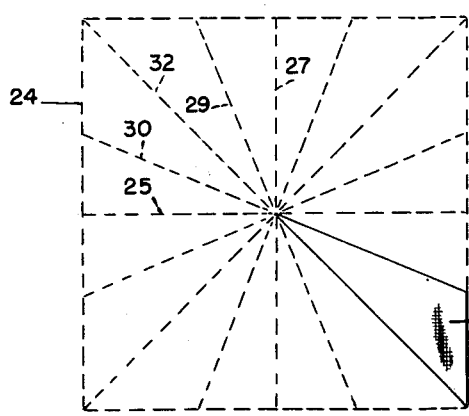

Figs. 9–14 inclusive illustrate the method of producing yet another type of preferred buff finger which may have abrasive applied thereto if desired. A square sheet of buff material 24 such as cotton fabric is folded along a line 25 parallel to and midway between two edges of the same to form an elongated rectangle 26. Such rectangle is then again folded along a line 27 parallel to and midway between the two farthest spaced sides of such rectangle to form a square 28 one-quarter the size of the original square 24. Such square 28 is then folded along two lines 29 and 30 extending from the corner representing the juncture of folds 25 and 27 to points on the respective opposite sides of such square, the edges defined by such folds 25 and 27 meeting as shown in Fig. 12. The resulting polygon 31 is folded along line 32 defined by such meeting of folded edges 25 and 27 to form triangular finger 33 (Fig. 13), folded edges 25 and 27 being included within such last fold. As will be seen by a comparison of Figs. 12 and 13, the material comprising such finger 33 is of uniform thickness from the narrow tip end 34 to line 35, the remaining material beyond such latter line comprising fewer layers. The end portion of finger 33 opposite to narrow tip end 34 will accordingly be trimmed away, ordinarily at a later stage in the assembly, as explained below.

Figure 16:
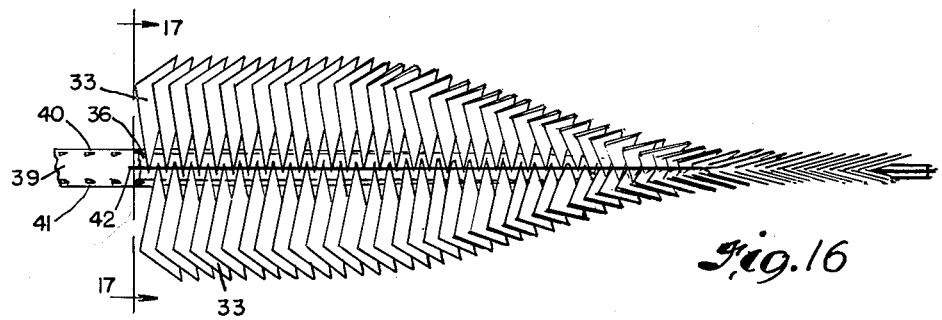
Figure 17:
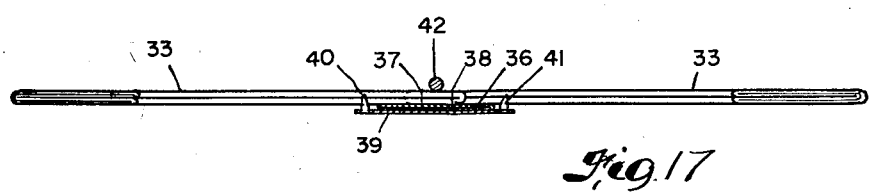
Figure 18:
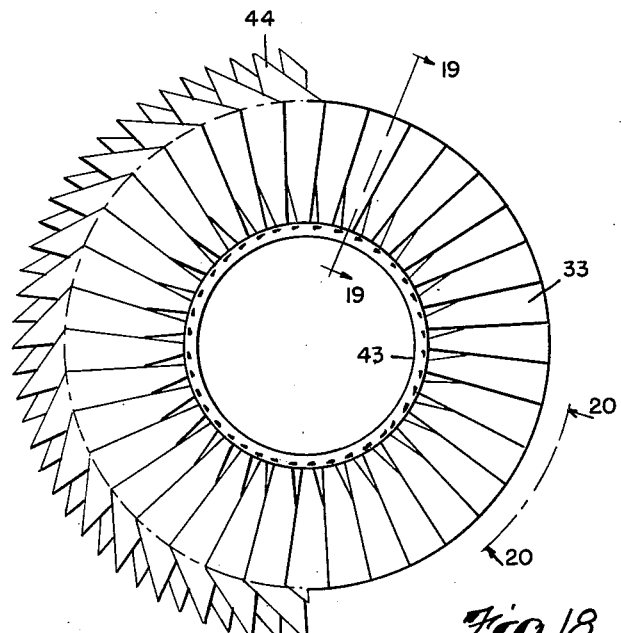
Figure 19:
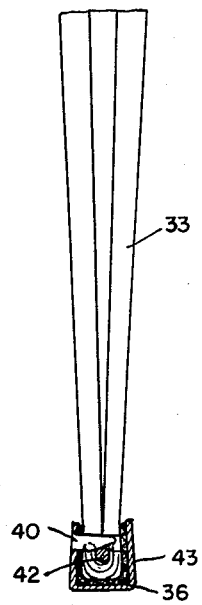
Figure 20:
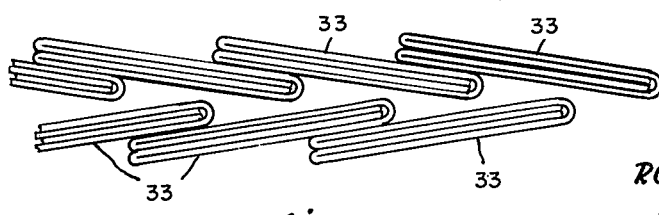

A plurality of such tapered fabric fingers 33 will now be arranged in two oppositely extending overlapping rows as shown in Fig. 15 with their narrow end portions 34 lying upon a continuous fabric strip 36 which may likewise be of cotton textile material, for example, and attached to the latter as by two rows of stitching 37 and 38. Any other type of attaching means such as adhesive, staples, etc., may, however, be employed as desired. It will now be seen that a continuous interconnected series of oppositely extending buffing fingers has been produced adapted to be assembled into a complete buff by bringing such series of oppositely extending fingers into parallelism. While fabric strip 36 may thus be folded along its longitudinal center line to bring the rows of fingers into close side-by-side relationship and then circularized to form a buff element for mounting on an arbor, adapter, or the like between appropriate end plates or other clamping means, it is generally preferred first to apply a metal backing strip as in the case of the Fig. 6 and Fig. 7 embodiment. As shown in Figs. 16 and 17, such fabric strip 36 (preferably having its edge portions turned in prior to stitching fingers 33 thereto) is applied to the upper face of continuous flat metal strip 39, preferably having rows of upstanding teeth 40 and 41 of the type described in my Patent No. 2,303,386 adjacent the edges thereof. An elongated retaining element such as wire 42 may then be applied thereto along the longitudinal center line of strips 36 and 39 and strip 39 shaped to channel form, thereby bringing the oppositely extending fingers 33 into close side-by-side relationship and forming a continuous self-supporting buff strip generally similar to that illustrated in Fig. 7. This strip may now be circularized either helically or to form a single annular turn with a double row of radially extending buffing fingers 33 secured in the channelform brush back 43. It has been found most convenient to trim away the irregular protruding end portions 44 of fingers 33 at this stage in the operation as shown in Fig. 18 since the ends of such fingers may thus be trimmed to the desired circular contour. On the other hand, if it is intended to employ the buff material in the form of straight or substantially straight lengths of buff strip, then such irregular end portions of fingers 33 may be trimmed away immediately upon formation of metal strip 39 into channel back 43 as shown in Fig. 16. Upon viewing the trimmed periphery of the annular rotary buff illustrated in Fig. 18, it is seen (Fig. 20) that the buffing fingers 33 tend automatically to position themselves in staggered overlapping relationship, thereby canting such fingers in a manner avoiding any likelihood of "streaking" when the rotating buff is brought into engagement with the work.

Buff strip as illustrated in Fig. 15, instead of being assembled into a continuous channelform back as taught in my Patent No. 2,303,386 and illustrated in Figs. 16 and 17, may be assembled into other types of backs such, for example, as that illustrated and described in Whittle Patent No. 2,288,337. In this case, a length of the Fig. 15 buff strip is selected sufficient to extend about the periphery of the Whittle annulus and assembled therewith in the manner more particularly described in such Whittle patent to form an annular buff with fingers 33 radiating from the channelform back 45 and retained therein by the inner deformed metal ring 46. It will, of course, be understood that such methods of assembling my novel buff material into appropriate backs or other supporting means are given merely by way of illustration of the adaptability of such material for handling in a manner generally similar to that in which conventional stranded brush material may be handled.

My novel generally conical buffing fingers 33 may have areas of abrasive adhered thereto, preferably in the regions 47 indicated in Fig. 23. It will be seen that the abrasive will desirably be printed on the original square of fabric 24 in regions spaced from the center of such square which will form the pointed end 34 of the folded finger 33 and also slightly spaced from line 35 demarking the general line where the irregular end portion of the finger 44 will be cut away. The abrasive may thus be printed on one or both sides of sheet 24 but will ordinarily preferably not be printed on the two facets (Fig. 14) which will form the two outer sides of the finished finger 33. In fact, it will frequently be preferred in all embodiments of my invention that the abrasive coated regions shall not include the outermost sides of the finished buff. Thus, in the Fig. 2 form, the folds of non-abrasive fabric comprise the actual sides of the buff section illustrated; in the Fig. 3 embodiment, the outermost discs of fabric may have the abrasive stripes on their inner faces only; and in the Fig. 5 embodiment, the abrasive stripes may be imprinted only on the sides of the fabric discs which form the inner surfaces of the conical pleated fingers.

Pairs of conical pleated fingers 48 and 49 may be formed in a manner generally similar to fingers 16 and 17 shown in Fig. 5 except that each such pair may be separate from the other pairs (i. e. not joined at their outer extremities). Such pairs of fingers may then be assembled in a continuous row as shown in Fig. 24 and continuous strips of fabric 50 and 51 applied thereto on opposite sides along the line defined by the points of joining 15 of the same, such strips 50 and 51 being joined together and to such fingers by means of parallel rows of stitching 52 and 53. It will thus be seen that a continuous strip of oppositely extending conical pleated buffing fingers is produced resembling that of Fig. 5 but with the pairs of fingers joined together adjacent their inner ends to form a continuous series rather than joined together adjacent their outer ends. Such strip of buffing fingers may be assembled into a channelform back as above described or mounted on appropriate hubs or adapters between clamping means.

While many types of adhesives may be employed to secure the abrasive to the buff fabric, depending on the particular application, the following may be mentioned: animal glues, glycerine phthalate resins such as "Dulux," Bakelite resins, cellulose base resins, casein glue, and even waxes such as cerotic acid wax and greases such as mutton tallow. Ordinarily adhesives are preferred which have relatively little stiffening effect on the fabric and do not tend to smear the work, or at least may be readily removed from such work. The adhesive should not be too brittle but should stand up under impact in use. When synthetic plastic sheet material is employed as the buff fabric, the abrasive may be adhered by pressing into the plastic surface, with application of heat or solvent where appropriate to bond the abrasive grains thereto.

Adhesive will desirably be printed on the fabric by the well-known roller process and the abrasive then dusted thereon. In this manner, the abrasive will be secured only to the precise areas desired and all excess is readily blown away. If desired, however, the abrasive and adhesive can be applied together.

Among abrasive materials suitable for different operations are: aluminum oxides such as Alundum and Aloxite, silicon carbide (Carborundum), precipitated aluminum oxide, emery, rouge, pumice (Tripoli), sharp sand, bauxite, and diatomaceous earth. Fabric having abrasive areas may also be provided by interweaving abrasive strands which may be of the type taught in Radford Patent No. 2,328,998, for example.

Since the abrasive stripes preferably do not extend radially inwardly to the inner periphery of my new rotary buffs, not only do I obtain improved ventilation with proper density at the working surface (despite radial spreading) but also the buff "fingers" are attached by relatively flexible means to the back or the like. The resultant rotary surface-conditioning tool preserves the desirable attributes of the buff, with a much enhanced abrasive action.

It will be seen from the foregoing that I have provided a type of abrasive buff construction which is both flexible and cool in operation and which is particularly adapted for machine manufacture. In other words, the buff material may be preassembled in a manner facilitating its incorporation within a metal channelform back, for example, in the general manner described in my prior Patent No. 2,303,386. The greater part of both the buff fabric and abrasive is concentrated toward the outer periphery of the buffing tool where it will be of use, and also providing the desired density of material in this region. The various radially extending folds and pleats do not expose cut fabric edges so that raveling and premature dissolution of the buff fabric is substantially eliminated.

While the buff strip of my invention may commonly be circularized to form a helix or single turn annulus with the buff material extending generally radially therefrom, straight lengths of my new buff strip may also be employed arranged parallel to the arbor on which they are supported or in long lead helical form. Buffs and brushes of this general conformation are, of course, already known in the art. Likewise, a length of buff strip may be circularized with the buff material extending in a generally axial direction rather than radially to form a cup-shaped buffing tool. This general type of construction is also well known.

Figure 7:
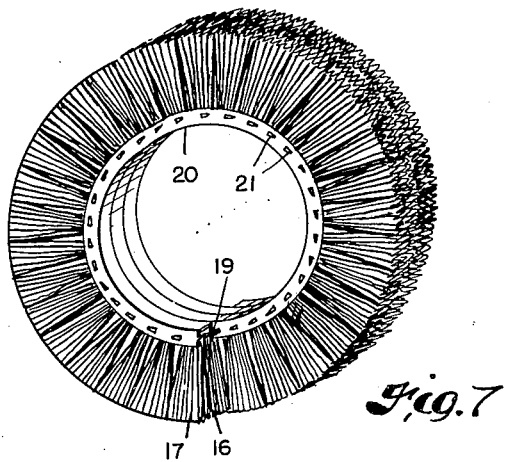

It will be apparent from a consideration of Figs. 9 to 15 of the drawing that discs of buff fabric might be employed rather than the squares which are folded to provide the flat generally triangular buffing fingers. It is less expensive, however, to employ such squares so that but one final trimming operation is required, without the necessity of first dieing out such fabric discs. A variety of hubs, adapters, etc., which may be of cardboard, metal, wood, or plastic materials, well known in the art, may be employed to mount the annular buffing tools upon an arbor or mandrel. An annular channelform back of the type disclosed in my prior Patent No. 2,409,309 may desirably be employed with my novel buff construction to obtain full advantage of the ventilating features, providing a very cool-running buff. Furthermore as well shown in Figs. 18 and 24, the individual buffing fingers may desirably be spaced from one another at their inner ends so that such ventilation is much facilitated. In buffs as shown in Figs. 2, 7, and 18, for example, certain benefits of my invention are obtained when the fabric is coated uniformly with abrasive except in the region adjacent the supporting member or back since a relatively dense working surface is thereby achieved while facilitating ventilation in such region. I ordinarily much prefer to apply the abrasive in stripes, however, with the folding of the fabric taking place intermediate such stripes, the yielding, flexible characteristics of the buff being thereby preserved.

Certain subject-matter disclosed but not claimed herein is disclosed and claimed in my co-pending applications Serial No. 308,242 filed September 6, 1952, and Serial No. 318,160 filed November 1, 1952.

Other modes of applying the principle of the invention may be employed, change being made as regards the details described, provided the features stated in any of the following claims or the equivalent of such be employed.

I therefore particularly point out and distinctly claim as my invention:

1. An abrasive buff element comprising a metal channelform back and buff material retained therein and extending therefrom, said buff material comprising pairs of flexible fabric discs joined in their center regions and having circumferentially spaced stripes of abrasive material adhered thereto and extending to their outer peripheries, the radially inner ends of such stripes being spaced from such center regions, said discs being separated, except where thus joined, to form pairs of generally conical tubular pleated fingers with said discs being folded along radial lines intermediate such abrasive stripes thus to form such pleats, and an elongated retaining member longitudinally disposed within said channelform back and overlying such pairs of fingers in their regions of joining to secure the same therein with the fingers of each pair extending in side-by-side relationship.

2. A rotary buff comprising an inner annular supporting element and buff material extending generally radially therefrom, said buff material comprising pairs of fabric discs joined at their centers but otherwise separated to form pairs of generally tubular pleated fingers, stripes of abrasive material adhered to said buff material intermediate the lines of folding of such pleats only, and means securing said pairs of fingers to said supporting element at their points of joining, with the fingers of each pair extending in side-by-side relationship.

3. A buffing element comprising a metal channel back and buff material retained therein, said buff material comprising pairs of fabric discs joined at their centers and separated otherwise to form pairs of generally conical tubular pleated fingers, said fingers being connected to adjacent pairs of fingers near their outer extremities, stripes of abrasive material adhered to said buff material intermediate the lines of folding of such pleats only, and an elongated retaining member overlying such pairs of fingers at their points of joining to secure the same in said channel back with the fingers of each pair extending therefrom in generally side-by-side relationship.

4. A buffing element comprising a support and buff material secured thereto, said buff material comprising pairs of generally tubular fabric fingers joined together at their inner ends, retaining means securing said pairs of fingers to said support at their points of joining, with the fingers of each pair extending in side-by-side relationship from said support, and stripes of abrasive material on said tubular fabric fingers extending longitudinally thereof.

5. A buffing element comprising a support and buff material secured thereto, said buff material comprising pairs of generally tubular fabric fingers joined together at their inner ends, retaining means securing said pairs of fingers to said support at their points of joining, with the fingers of each pair extending in side-by-side relationship from said support, and stripes of abrasive material on the inner surfaces only of said tubular fabric fingers extending longitudinally thereof.

6. The method of producing an abrasive buff element which comprises joining pairs of discs of flexible buff fabric together in their center regions, adhering generally radially extending stripes of abrasive material to such discs, separating such discs except where thus joined together to form oppositely extending generally conical pleated fingers, such fabric being folded along lines intermediate such abrasive stripes to form such pleats, and securing such pairs of fingers in an elongated channelform back in the region of joining with the fingers of each pair extending therefrom in close side-by-side relationship.

References Cited in the file of this patent

UNITED STATES PATENTS

| Number | Name | Date |
|---|---|---|
| 277,097 | Abbe | May 18, 1883 |
| 537,687 | Keighley | Apr. 16, 1895 |
| 684,203 | Eaton | Oct. 8, 1901 |
| 794,496 | Gorton | July 11, 1905 |
| 945,177 | Levett | Jan. 4, 1910 |
| 963,523 | Crismore | July 5, 1910 |
| 981,841 | Codman et al. | Jan. 17, 1911 |
| 1,890,502 | Divine | Dec. 13, 1932 |
| 1,890,894 | Arnold et al. | Dec. 13, 1932 |
| 1,927,862 | Zimmerman | Sept. 26, 1933 |
| 2,140,208 | Murray | Dec. 13, 1938 |
| 2,146,284 | Churchill | Feb. 7, 1939 |
| 2,146,548 | Mitshang et al. | Feb. 7, 1939 |
| 2,328,998 | Radford | Sept. 7, 1943 |
| 2,376,254 | Humphrey et al. | May 15, 1945 |
| 2,483,879 | Churchill | Oct. 4, 1949 |